United States Patent
Blot et al.

(10) Patent No.: US 8,628,709 B2
(45) Date of Patent: Jan. 14, 2014

(54) METHOD FOR PRODUCING A CONCAVE-SHAPED IN PARTICULAR U-SHAPED PIECE IN A COMPOSITE MATERIAL AND DEVICE FOR CARRYING OUT THE SAME

(75) Inventors: Philippe Blot, Nantes (FR); Sebastien Gohier, La Montagne (FR); Mathieu Lannuzel, Orvault (FR)

(73) Assignee: Airbus Operations SAS, Toulouse (FR)

( * ) Notice: Subject to any disclaimer, the term of this patent is extended or adjusted under 35 U.S.C. 154(b) by 125 days.

(21) Appl. No.: 13/122,634

(22) PCT Filed: Oct. 2, 2009

(86) PCT No.: PCT/FR2009/051883
§ 371 (c)(1),
(2), (4) Date: Jul. 28, 2011

(87) PCT Pub. No.: WO2010/040934
PCT Pub. Date: Apr. 15, 2010

(65) Prior Publication Data
US 2011/0272852 A1    Nov. 10, 2011

(30) Foreign Application Priority Data
Oct. 6, 2008  (FR) ...................................... 08 56753

(51) Int. Cl.
*B29C 45/14* (2006.01)
(52) U.S. Cl.
USPC ........................................................ 264/257

(58) Field of Classification Search
USPC ........................................................ 264/257
See application file for complete search history.

(56) References Cited

U.S. PATENT DOCUMENTS

| 2004/0219244 A1 | 11/2004 | Filsinger et al. |
| 2005/0031720 A1 | 2/2005 | Lippert et al. |
| 2006/0231981 A1 | 10/2006 | Lee et al. |

FOREIGN PATENT DOCUMENTS

| DE | 42 34 002 A1 | 4/1994 |
| WO | 97/36735 A1 | 10/1997 |

OTHER PUBLICATIONS

International Search Report, dated Jul. 26, 2010, from corresponding PCT application.

*Primary Examiner* — Larry Thrower
(74) *Attorney, Agent, or Firm* — Young & Thompson

(57) ABSTRACT

A process for manufacturing a piece made of composite material with a hollow form and including a fiber preform (50) that is embedded in a matrix, includes placing the preform (50) in a first chamber (64) delimited by a mold (52) that is in contact with the surface of the piece to be produced outside of the hollow form and a counter-mold (54) that is in contact with the surface of the piece to be produced inside of the hollow form, and using a mold (52) that is made in at least two parts (52.1, 52.2) and elements (78) for controlling the spacing of the at least two parts (52.1, 52.2) that are contiguous using the expansion phenomenon during the polymerization phase.

15 Claims, 3 Drawing Sheets

METHOD FOR PRODUCING A CONCAVE-SHAPED IN PARTICULAR U-SHAPED PIECE IN A COMPOSITE MATERIAL AND DEVICE FOR CARRYING OUT THE SAME

BACKGROUND OF THE INVENTION

1. Field of the Invention

This invention relates to a process for manufacturing a piece made of composite material with a concave shape, in particular a beam with a U-shaped cross-section. It also relates to a device for its implementation whose purpose is, on the one hand, to ensure a homogeneous impregnation of a fiber preform by injection or infusion of a product that can form a matrix, and, on the other hand, to ensure a good surface condition and an optimal dimensional precision in particular on the level of the outside surface.

1. Description of the Related Art

The pieces made of a composite material comprise a matrix, for example made of resin, reinforced by fibers. According to one widely used embodiment, the fibers come in the form of a fiber preform, with one or more fold(s) that are woven or not.

Prior to the polymerization phase, the product that forms the matrix is to impregnate this preform homogeneously to obtain a piece that has optimal characteristics.

According to a first operating mode, referred to as injection, the product that forms the matrix, generally resin, is injected into the preform at one or more points and even over the entire surface of the preform, optionally with a diffusion medium.

According to another operating mode, referred to as infusion, the product that forms the matrix is integrated in the preform and comes in the form of, for example, one or more inserted resin film(s) or film(s) placed side by side with folds that form said preform.

Figure 1:
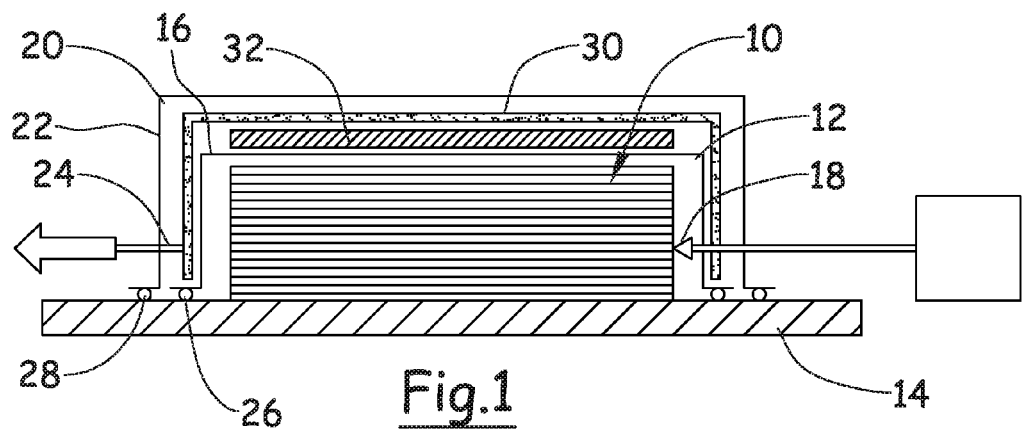

To implement this impregnation, a device as described in particular in the documents US2004/0219244 or US2005/0031720 and illustrated in FIG. 1 is used.

According to this document, the preform 10 is placed in a first chamber 12 that is delimited by a substrate 14 and a first semi-sealed membrane 16, i.e., permeable to gas but sealed to the product that is able to form the matrix, whereby at least one feed point 18 is provided in said first chamber 12.

In addition, the device comprises a second chamber 20 that is delimited, on the one hand, by a second gas-tight membrane 22, and, on the other hand, by the first semi-sealed membrane 16, whereby said chamber 20 comprises at least one opening 24 for extracting the gases that are contained in said second chamber 20 and thus allow the gases that are present in said first chamber 12 to pass.

The intake of gases into the first chamber 12 brings about the diffusion of the product that is able to form the matrix in the entire preform.

Thus, during the infusion or injection phase, the first semi-sealed membrane 16 ensures an optimum filling and degassing of the preform without drawing in the product that is able to form the matrix.

Sealing means 26 are provided to ensure the seal between the substrate 14 and the first semi-sealed membrane 16 as well as sealing means 28 between the substrate 14 and the second sealed membrane 22.

In addition, a draining fabric 30 can be placed in the second chamber so as to promote the evacuation of gases.

To obtain the smoothing of the surface of the preform that is in contact with the first semi-sealed wall 16, a smoothing plate 32 can be used and placed in the second chamber 20, inserted between the draining fabric and the first semi-sealed wall 16. It also makes it possible to homogenize the pressure forces on the preform.

According to one embodiment, the semi-sealed membrane 16 consists of a microporous fabric, whereby the small diameter of the pores makes possible the passage of gases but blocks the passage of viscous fluids such as the product that is able to form the matrix.

This invention relates more specifically to the manufacturing of beams, used in the aeronautical field, for example at the central section of an aircraft.

Figure 2:
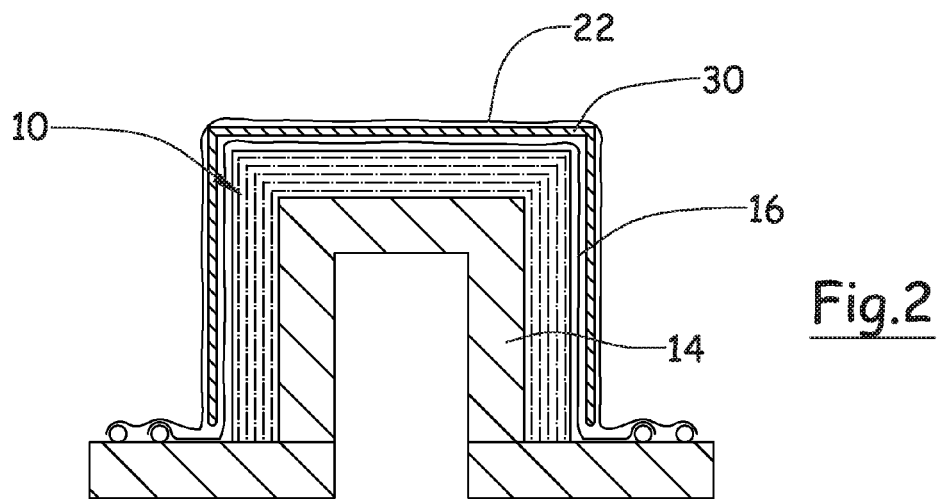

According to an operating mode that is illustrated in FIG. 2 for obtaining a beam with a U-shaped cross-section, the same elements as those illustrated in FIG. 1 are used, with the substrate 14 having a U shape that is adapted to the inside face of the U-shaped cross-section. The layers or folds of fibers are draped over the substrate 14 automatically or manually.

Below, the other elements of the device are applied to the U-shaped preform.

This operating mode does not provide satisfaction because it does not make it possible to control the thicknesses and to obtain a satisfactory surface condition at the outside surface (the one that is not in contact with the substrate 14).

Consequently, following the polymerization, it is necessary to correct the geometry of the thus produced piece to assemble it with adjacent pieces. This additional operation leads to increasing the manufacturing cost of the piece and to a loss of resistance because of the breaking of fibers during the geometric correction of the piece.

Figure 3:
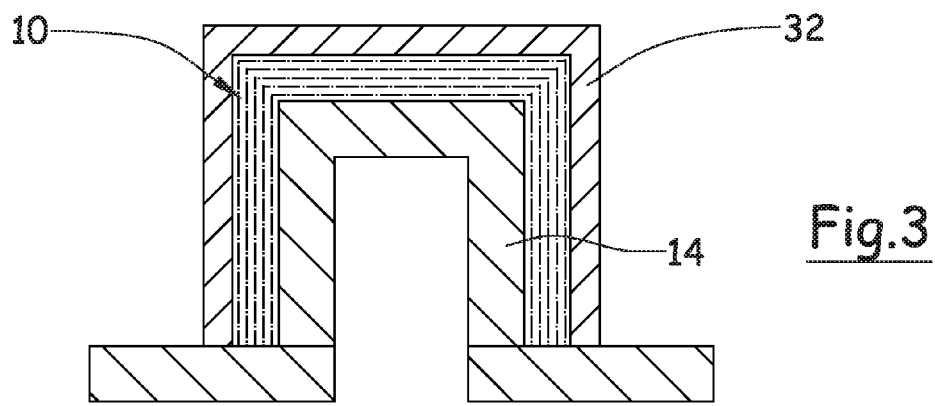

According to another operating mode that is illustrated in FIG. 3, the piece is made between a mold 14 and a counter-mold 32:

After the draping of the layers or folds of fibers on the substrate 14 that is placed between the branches of the U, the counter-mold 32 is installed.

Even if it makes a better control of the thicknesses possible, this operating mode is not satisfactory because it is necessary to use a counter-mold 32 that does not expand with temperature, for example a carbon-based material, for enabling demolding of the piece, which leads to significantly increasing the cost of the device. Actually, the counter-mold 32 would have a tendency to tighten the piece if it was metal because of a contraction phenomenon during the cooling phase.

SUMMARY OF THE INVENTION

Also, the purpose of this invention is to remedy the drawbacks of the prior art by proposing a process for the production of a piece that is made of composite material and comprising a concave shape, in particular a U-shaped cross-section, making it possible to control the thicknesses and to obtain a satisfactory surface condition.

For this purpose, the invention has as its object a process for manufacturing a piece made of composite material with a hollow form and comprising a fiber preform that is embedded in a matrix, consisting in placing said preform in a first chamber that is delimited by a mold that is in contact with the surface of the piece to be produced outside of the hollow form and a counter-mold in contact with the surface of the piece to be produced inside of the hollow form, characterized in that it consists in using a mold that is made in at least two parts and means for controlling the spacing of said at least two parts that are contiguous using the expansion phenomenon during the polymerization phase.

BRIEF DESCRIPTION OF THE DRAWING FIGURES

Other characteristics and advantages will emerge from the following description of the invention, a description that is provided only by way of example, relative to the accompanying drawings, in which:

FIG. 1 is a cutaway view that illustrates a device for producing a piece made of composite material by injection according to the prior art, FIG. 2 is a cutaway view that illustrates a device for producing a U-shaped beam according to a first variant of the prior art, FIG. 3 is a cutaway view that illustrates a device for producing a U-shaped beam according to another variant of the prior art, and FIGS. 4A to 4G are cutaway views that illustrate the different stages of a process for the production of a piece made of composite material with a U-shaped cross-section according to the invention.

DETAILED DESCRIPTION OF THE INVENTION

Figure 4A:
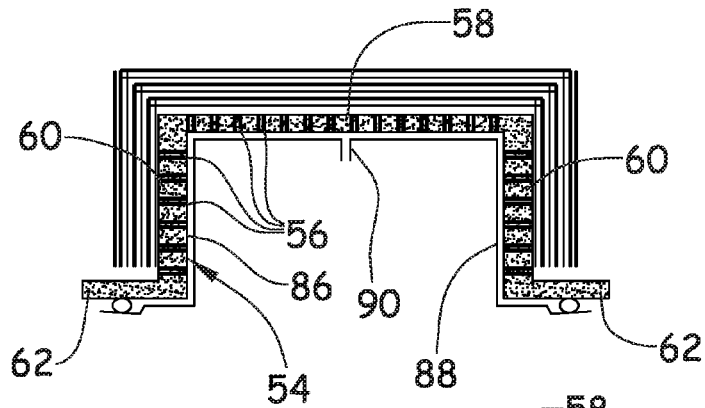
Figure 4B:
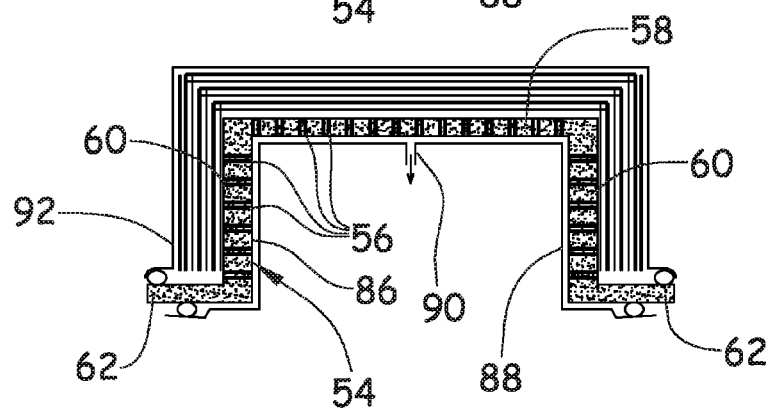
Figure 4C:
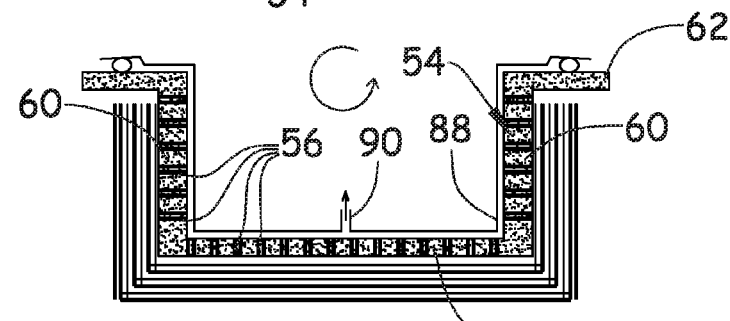
Figure 4D:
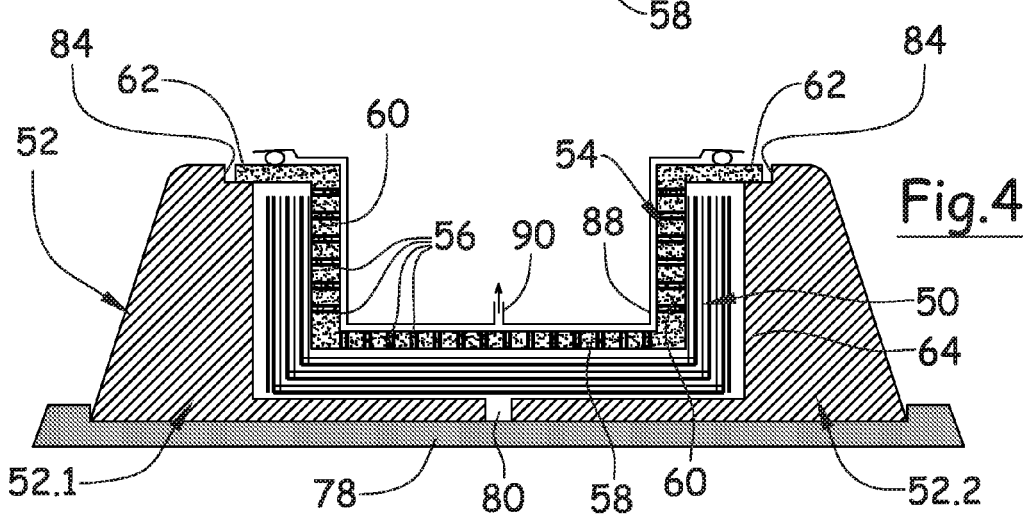
Figure 4E:
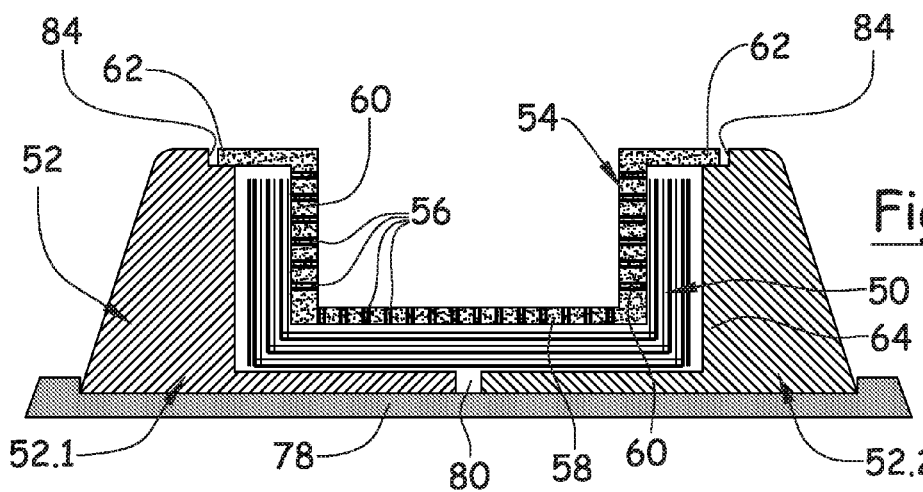
Figure 4F:
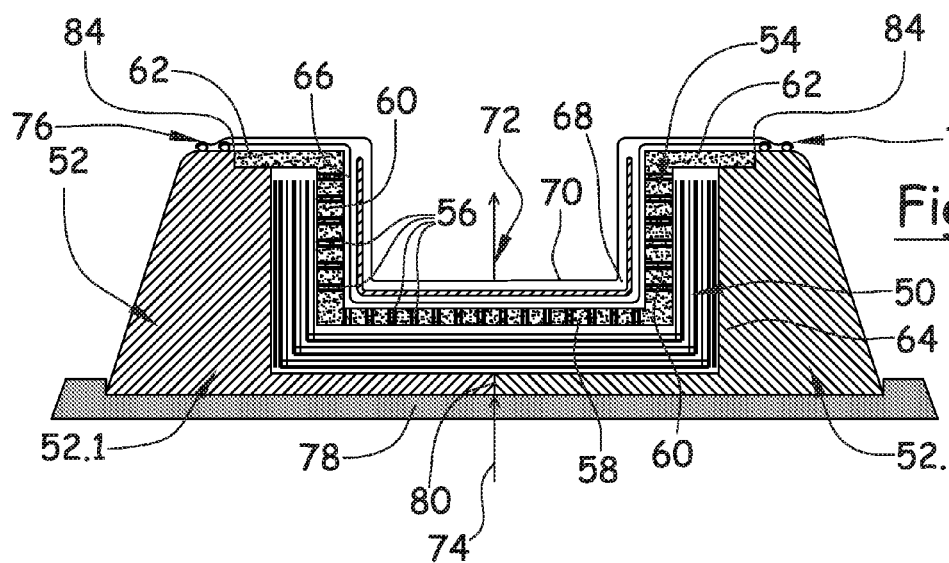

At 50, FIG. 4F shows at least one fiber preform that is designed to be embedded in a matrix, for example a resin, in such a way as to obtain, after polymerization, a piece made of composite material that forms a piece of an aircraft. However, the process of the invention is not limited to the aeronautical field.

This invention relates more particularly to a preform with a U-shaped cross-section that makes it possible to obtain, for example, a beam.

However, the invention is not limited to this cross-section shape, whereby the cross-section can be V-shaped or have a concave shape.

Hereinafter, inside surface is defined as the hollow surface, namely the surfaces of the branches and the base of the U-shaped cross-section that are oriented toward the zone that is located between the branches of the U, and outside surface is defined as the opposite surface.

According to the variants, the preform can be obtained by stacking fiber folds or by assembling fiber panels, whereby the fibers can be arranged according to an organized or random arrangement.

The matrix is produced from a product that can be fluid in a first state and solid in a second state. By way of example, the matrix is formed by resin.

The product that is able to form the matrix is not described in more detail because it is known to one skilled in the art and can vary based on desired characteristics.

According to a first operating mode, referred to as injection, the product that is able to form the matrix can be injected into the preform and can come from a distant reservoir of the preform.

According to another operating mode, referred to as infusion, the product that is able to form the matrix can be stored in solid form in the preform, for example in the form of at least one film.

According to the invention, the device comprises a first mold 52 whose shapes are adapted to those of the outside surfaces of the piece to be made and a counter-mold 54 whose shapes are adapted to those of the inside surfaces of the piece to be produced.

Thus, the mold is in contact with the surface of the piece to be produced that is located on the outside of the hollow form, and the counter-mold is in contact with the surface of the piece to be produced that is located at the hollow form.

The counter-mold 54 comprises a number of openings 56 that make the gas passage possible.

According to one embodiment that is suitable for manufacturing the U-shaped piece, the counter-mold has a U-shaped cross-section with an essentially constant thickness over its cross-section, with a base 58 and two branches 60 that are essentially parallel and edges 62 that are provided at the ends of said branches 60, extending parallel to the base 58 toward the outside of said branches 60.

Preferably, the counter-mold comes in the form of at least one plate with pipes, emptying on both sides of said at least one plate, provided at the base 58 and branches 60. According to one embodiment, the pipes 56 are obtained by perforation or microperforation.

When the mold and the counter-mold are fitted into one another, they delimit between them a first chamber 64 in which the preform 50 is arranged. The edges 62 of the counter-mold 54 rest against shoulders that are located at the mold 52 as illustrated in FIG. 4F, at least during the polymerization phase so that the thicknesses of the piece are within the required tolerances.

As illustrated in FIG. 4F, the device also comprises a first semi-sealed wall 66, i.e., permeable to gas and impermeable to the product that is able to form the matrix, whereby said wall covers at least the counter-mold 54, a second chamber 68 that is delimited by a second gas-tight wall 70 and said first semi-sealed wall 66, as well as means 72 for extracting the gases from the second chamber 68.

The means 72 for extracting the gases comprise at least one pipe that communicates with the second chamber 68 via at least one opening. These means 72 are not described in more detail because they are known to one skilled in the art.

In the case of an operating mode by injection, the device comprises at least one product feed 74 that is able to form the matrix that empties into the first chamber 64 via at least one opening. This feed is not presented in more detail because it is known to one skilled in the art and can have different configurations based in particular on the product that is able to form the matrix and/or the piece to be produced.

The second wall 70 that is gas-tight can come in the form of a flexible and sealed membrane, like the devices of the prior art.

According to one embodiment, the gas-permeable membrane 66 consists of a microporous fabric, for example a Gore-tex®-type fabric.

Sealing means 76 are provided between the first wall 66 and the mold 52 as well as between the second wall 70 and the mold 52.

In addition, the device can comprise fabrics to delaminate the preform on both sides so as to promote the demolding of the piece that is produced as well as a netting with an anti-adhesive coating or combined with a fabric to be delaminated that is in direct contact with the substrate 52 to promote the surface diffusion for the large preforms of the product that can form the matrix before injection into the preform. The netting that ensures the diffusion of the resin extends over the majority of the surface of the preform 50 to make it possible to produce large pieces.

According to the invention, the mold 52 and counter-mold 54 are metal. By way of example, they are made from an aluminum alloy.

The fact of not producing at least one of the mold or counter-mold elements in a material that does not expand with temperature makes it possible to reduce the costs of the device and therefore of the piece that is produced.

According to the invention, the mold 52 that is arranged on the outside of the U is produced in at least two parts 52.1 and 52.2, whereby the junction zone of the two parts is arranged at the base, and the device comprises means 78 for controlling the spacing of the two parts 52.1 and 52.2 and thereby monitoring the thicknesses of the piece to be produced. Preferably, the supply 74 of product that can form the matrix can be done through the attachment plane 80.

This arrangement also makes it possible to be able to demold the mold after cooling, with the mold having a tendency to contract during its cooling.

According to one embodiment, the attachment plane 80 is arranged at the median plane of the piece to be produced.

The two parts of the mold 52 are dimensioned in such a way as to be contiguous during the polymerization phase (FIG. 4F), either at a high temperature—and to be separated prior to the polymerization phase (FIGS. 4E, 4D, and 4G) or after the polymerization phase—or at a lower temperature.

According to one embodiment, the means 78 for controlling the spacing of the two parts 52.1 and 52.2 of the mold comprise a base that comprises—at its upper surface—a bowl shape with a base 82 that offers a support plane on which the two parts 52.1 and 52.2 can rest and slide and edges 84 against which the two parts 52.1 and 52.2 rest at least during the polymerization phase for controlling the spacing between said parts.

As a variant, the means 78 for controlling the spacing of the two parts 52.1 and 52.2 of the mold can come in the form of straps or tie rods made of a material that expands very little with temperature. In the case of tie rods, the two parts of the mold can slide along said tie rods until they rest against stops provided at each end of said tie rods, at least during the polymerization phase for controlling the spacing between said parts.

According to different variants, the means 78 comprise, on the one hand, guide means for monitoring the movements of the two parts 52.1 and 52.2 of the mold and for allowing a spacing movement, and, on the other hand, stops against which the two parts 52.1 and 52.2 of the mold can rest at least during the polymerization phase for controlling the spacing between said parts 52.1 and 52.2.

The counter-mold 54 is rigid or semi-rigid so as to be able to support the draping operations without becoming deformed, the inside forms of the counter-mold 54 corresponding to the inside geometry of the piece to be produced at the polymerization temperature of the resin that is used to form the matrix.

The device is used in the following manner.

As illustrated in FIG. 4A, the counter-mold 54 is equipped, in a first step, at its inside surface 86 with a vacuum bag 88 and an end fitting 90 for drawing in the gases. Preferably, a semi-sealed film (permeable to gases but impermeable to resin) and a draining fabric placed between the counter-mold 54 and the vacuum bag 88 are also provided.

Next, the counter-mold 54 is arranged back to front, the edges 62 resting on a substrate. The folds or layers are draped on the counter-mold 54 in such a way as to form a preform. Advantageously, a fabric that is to be delaminated is inserted between the counter-mold and the preform. Thus, the counter-mold is used as a draping punch.

As illustrated in FIG. 4B, the preform is compacted under vacuum at a temperature that is on the order of 100 to 150° C. (according to the nature of the material). For this purpose, a compacting membrane 92 covers the preform, whereby sealing means that are inserted between said membrane 92 and the counter-mold 54 are provided on the periphery of the preform so that the vacuum bag and the compacting membrane form a chamber. To achieve the compacting, the gases are extracted via the end fitting 90.

Preferably, the compacting membrane 92 has shapes that are suitable for the preform so as not to crush the preform at angles. This compacting phase makes it possible to limit the risks of defects at the angles.

Next, the compacting membrane 92 is withdrawn, and the counter-mold 54 is returned, as illustrated in FIG. 4C, to be placed in the mold 52, as illustrated in FIG. 4D. First of all, a fabric to be delaminated and a diffuser netting are inserted between the preform and the mold 52.

To keep the preform in contact against the counter-mold during the return and the insertion into the mold 52, negative pressure is generated using the end fitting 90.

Thus, the counter-mold is used as a tool for handling the preform. Next, as illustrated in FIG. 4E, the vacuum bag 88 and the possible other elements that are used during the draping and the compacting of the preform can be withdrawn.

Finally, the first wall 66, a draining fabric, the second wall 70, and different sealing means or other elements that are necessary for the homogeneous impregnation of the resin into the preform are added.

According to an operating mode that is referred to as injection, a resin supply is provided, whereby the negative pressure in the chamber 68 makes it possible to homogenize the impregnation of the fibers by the resin.

Figure 4G:
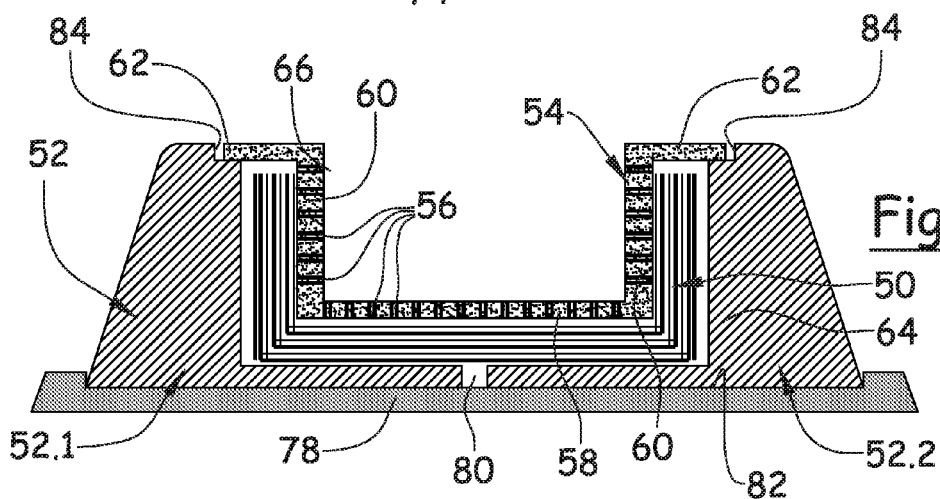

After polymerization, the different membranes are withdrawn, as illustrated in FIG. 4G. Demolding is done under cold conditions, at a temperature of below 50° C., to take advantage of the differential of thermal withdrawal of each part of the mold and the counter-mold relative to that of the piece that produces the separation of the counter-mold and the piece and at least one portion of the mold and the piece.

The invention claimed is:

1. A process for manufacturing a piece made of composite material with a hollow form, comprising:
    placing a preform (50) in a first chamber (64) delimited by a mold (52) fiber that is in contact with a surface of an outside of the hollow form, the mold being in at least two parts (52.1, 52.2);
    contacting a surface of the piece inside of the hollow form; and
    polymerizing matrix of the piece, wherein
    a controller (78) controls spacing such that said at least two parts (52.1, 52.2) are configured by edges or stops to be contiguous along an attachment plane (80) utilizing an expansion phenomenon during the polymerizing, and said at least two parts (52.1, 52.2) are separated prior to polymerization or after polymerization.

2. The process for manufacturing a piece according to claim 1, wherein said at least two parts (52.1, 52.2) have a spacing movement between the two parts (52.1, 52.2) of the mold and the stops against which the two parts (52.1, 52.2) of the mold can rest at least during the polymerizing to control spacing between said at least two parts (52.1, 52.2).

3. The process for manufacturing a piece according to claim 1, further comprising utilizing a counter-mold (54) that comprises a plurality of openings (56) that enable gases to pass and extracting gases in a chamber (68) that is delimited by a first semi-sealed wall (66) that is gas-permeable and impermeable to a product that can form the matrix so as to achieve diffusion of the product that is able to form the matrix in the preform (50).

4. The process for manufacturing a piece according to claim 1, further comprising placing the preform on a counter-mold (54) that is equipped at an inside surface of the counter-mold with a vacuum bag (88) and an end fitting (90) for drawing in gases and keeping the preform flattened against the counter-mold.

5. The process for manufacturing a piece according to claim 4, further comprising compacting the preform under vacuum.

6. The process for manufacturing a piece according to claim 5, further comprising compacting the preform at a temperature on an order of 100 to 150° C.

7. The process for manufacturing a piece according to claim 5, wherein a compacting membrane (92) forms a chamber with the vacuum bag (88), in which the preform is placed.

8. The process for manufacturing a piece according to claim 7, further comprising utilizing a membrane with forms that are suitable for the preform so as not to crush said preform at the angles.

9. The process for manufacturing a piece according to claim 2, further comprising utilizing a counter-mold (54) that comprises a plurality of openings (56) that enable gases to pass and extracting gases in a chamber (68) that is delimited by a first semi-sealed wall (66) that is gas-permeable and impermeable to a product that can form the matrix so as to achieve diffusion of the product that is able to form the matrix in the preform (50).

10. The process for manufacturing a piece according to claim 2, further comprising placing the preform on a counter-mold (54) that is equipped at an inside surface of the counter-mold with a vacuum bag (88) and an end fitting (90) for drawing in gases and keeping the preform flattened against the counter-mold.

11. The process for manufacturing a piece made of composite material according to claim 3, further comprising placing the preform on the counter-mold (54) that is equipped at an inside surface of the counter-mold with a vacuum bag (88) and an end fitting (90) for drawing in gases and keeping the preform flattened against the counter-mold.

12. The process for manufacturing a piece according to claim 6, wherein a compacting membrane (92) forms a chamber with the vacuum bag (88), in which the preform is placed.

13. The process for manufacturing a piece according to claim 1, wherein the controller (78) is formed from a bowl with a base (82) that provides a support plane on which the at least at least two parts (52.1, 52.2) can rest and slide, and the edges (84) against which the at least two parts (52.1, 52.2) can rest during polymerization.

14. The process for manufacturing a piece according to claim 1, wherein the controller (78) is formed from straps or tie rods, and the at least at least two parts (52.1, 52.2) are configured to slide along the straps or tie rods until the at least two parts (52.1, 52.2) rest against the stops provided at ends of the straps or tie rods during polymerization.

15. The process for manufacturing a piece according to claim 14, wherein the straps or tie rods have low thermal expansion.

* * * * *

UNITED STATES PATENT AND TRADEMARK OFFICE
CERTIFICATE OF CORRECTION

PATENT NO. : 8,628,709 B2  Page 1 of 1
APPLICATION NO. : 13/122634
DATED : January 14, 2014
INVENTOR(S) : Blot et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 239 days.

Signed and Sealed this
Twenty-second Day of September, 2015

Michelle K. Lee
*Director of the United States Patent and Trademark Office*